United States Patent
Marshall et al.

(10) Patent No.: US 10,902,427 B2
(45) Date of Patent: Jan. 26, 2021

(54) SYSTEM AND METHOD FOR DATA ANALYTICS

(71) Applicant: American Express Travel Related Services Company, Inc., New York, NY (US)

(72) Inventors: Vernon Marshall, London (GB); Sangarsh Nigam, New Providence, NJ (US); Ashish Sharma, Jersey City, NJ (US); Bhupinder Singh, Jersey City, NJ (US); Mira Srinivasan, Jersey City, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 897 days.

(21) Appl. No.: 14/954,430

(22) Filed: Nov. 30, 2015

(65) Prior Publication Data
US 2017/0154336 A1  Jun. 1, 2017

(51) Int. Cl.
*G06Q 20/40* (2012.01)
*G06Q 20/22* (2012.01)
*G06Q 30/02* (2012.01)

(52) U.S. Cl.
CPC ......... *G06Q 20/4016* (2013.01); *G06Q 20/22* (2013.01); *G06Q 20/405* (2013.01); *G06Q 20/409* (2013.01); *G06Q 30/0201* (2013.01)

(58) Field of Classification Search
CPC . G06Q 20/04; G06Q 30/0253; G07C 9/00087
See application file for complete search history.

(56) References Cited

U.S. PATENT DOCUMENTS

| | | | | |
|---|---|---|---|---|
| 5,521,363 A | * | 5/1996 | Tannenbaum | G06Q 20/341 235/375 |
| 5,559,313 A | * | 9/1996 | Claus | G06Q 20/105 235/380 |
| 5,578,808 A | * | 11/1996 | Taylor | G06Q 20/02 235/375 |
| 5,857,079 A | * | 1/1999 | Claus | G06F 17/246 235/380 |
| 7,624,073 B1 | * | 11/2009 | Robinson | G06Q 20/04 705/67 |
| 7,766,244 B1 | * | 8/2010 | Field | G06Q 20/357 235/493 |

(Continued)

*Primary Examiner* — Daniel S Felten
(74) *Attorney, Agent, or Firm* — Thomas | Horstemeyer, LLP (57) ABSTRACT

Systems and methods of improving the operation of a transaction network and transaction network devices is disclosed. A transaction network host may comprise various modules and engines as discussed herein wherein the probability that a transaction is a business or personal transaction may be evaluated for establishing proper usage of differentiated transaction instruments according to their proper purposes. For instance, a probable personal transaction may be identified as being associated with a business-oriented transaction card, whereby the transaction network may tailor the handling of the transaction, such as by denying it, whereby the transaction network may actively deter misuse of transaction products whereby the transaction network more properly functions according to approved parameters.

19 Claims, 6 Drawing Sheets

(56) References Cited

U.S. PATENT DOCUMENTS

| | | | |
|---|---|---|---|
| 10,083,301 B2* | 9/2018 | Hentunen | G06F 21/552 |
| 2004/0158524 A1* | 8/2004 | Anderson | G06Q 20/04 |
| | | | 705/42 |
| 2005/0010478 A1* | 1/2005 | Gravelle | G06Q 20/20 |
| | | | 705/16 |
| 2005/0055582 A1* | 3/2005 | Bazakos | G07C 9/00087 |
| | | | 726/19 |
| 2005/0273396 A1* | 12/2005 | Aliabadi | G06Q 30/0633 |
| | | | 705/26.1 |
| 2009/0132424 A1* | 5/2009 | Kendrick | G06Q 20/20 |
| | | | 705/75 |
| 2010/0268588 A1* | 10/2010 | Lal | G06Q 20/40 |
| | | | 705/14.21 |
| 2013/0138563 A1* | 5/2013 | Gilder | G06Q 20/4016 |
| | | | 705/44 |
| 2015/0193775 A1* | 7/2015 | Douglas | G06Q 30/0253 |
| | | | 705/14.23 |

* cited by examiner

|  | 25% ~218 | 50% ~219 | 75% ~220 | 90% ~221 | 95% ~222 | 99% ~223 |
|---|---|---|---|---|---|---|
| 25% ~212 | 2.5 | 4.6 | 12.9 | 35.6 | 72.3 | 89.2 |
| 50% ~213 | 2.9 | 6.3 | 17.4 | 44.3 | 79.7 | 92.8 |
| 75% ~214 | 4.7 | 10.3 | 25.4 | 56.4 | 87.5 | 95.1 |
| 95% ~215 | 8.2 | 17.2 | 37.6 | 69.5 | 92.4 | 97.3 |
| 99% ~216 | 12.6 | 26.0 | 49.0 | 78.9 | 93.9 | 97.4 |

| | 25% | 50% | 75% | 90% | 95% | 99% |
|---|---|---|---|---|---|---|
| 211 | 2.2 | 4.5 | 12.2 | 30.5 | 63.1 | 83.0 | 97.7 |
| 25% | 2.5 | 4.6 | 12.9 | 35.6 | 72.3 | 89.2 | 98.6 |
| 50% | 2.9 | 6.3 | 17.4 | 44.3 | 79.7 | 92.8 | 99.1 |
| 75% | 4.7 | 10.3 | 25.4 | 56.4 | 87.5 | 95.1 | 99.4 |
| 95% | 8.2 | 17.2 | 37.6 | 69.5 | 92.4 | 97.3 | 99.6 |
| 99% | 12.6 | 26.0 | 49.0 | 78.9 | 93.9 | 97.4 | 99.7 |

SYSTEM AND METHOD FOR DATA ANALYTICS

FIELD

The present disclosure relates to data analytics for transaction data.

BACKGROUND

Large data sets may exist in various sizes and levels of organization. With big data comprising data sets as large as ever, the volume of data collected incident to the increased popularity of online and electronic transactions continues to grow. Billions of rows and hundreds of thousands of columns worth of data may populate a single table, for example. An example of the use of big data is in identifying and categorizing business spending and consumer spending, which is frequently a key priority for transaction card issuers. However, transactions processed by the transaction card issuer are massive in volume and comprise tremendously large data sets. Frequently cardholders may hold a business-oriented transaction card, but may complete consumer transactions using the card. Similarly, cardholders may hold a consumer-oriented transaction card, but may complete business transactions using the card. These actions confuse and frustrate the identification and categorization of transaction data, while also hampering data analytics.

SUMMARY

In accordance with various embodiments, a transaction network may include a transaction network host configured to categorize a transaction according to a confidence scoring methodology. The network may also include a distributed storage system with a plurality of nodes, whereby the transaction network host directs data to be stored. The distributed storage system may be configured to direct data to the transaction network host in response to the confidence scoring methodology of the transaction network host. The transaction network may include a telecommunications transfer channel, including a network logically connecting the transaction network host to the distributed storage system.

The transaction network host may include a card type identification engine configured to accept card type data associated with a transaction from a node of a distributed storage system. The transaction network host may include a transaction counter-party industry identification engine configured to receive data from the node of the distributed storage system indicative of at least one of a merchant and a merchant type associated with the transaction. The transaction network host may include a ROC size assessor configured to receive data from the node of the distributed storage system including a percentile calculation of a relative size of the transaction. The transaction network host may include a transaction count aggregator configured to receive from the node of the distributed storage system an annual transaction count data of a cardholder associated with the transaction within a merchant industry. The transaction network host may include a communication bus disposed in logical communication with a confidence score determination module, the card type identification engine, the transaction counter-party industry identification engine, the ROC size assessor, and the transaction count aggregator. The transaction network host may include a confidence score determination module interoperable with the communication bus and configured to determine a confidence score for the transaction indicative of a probability that the transaction is a business transaction.

The bus controller may be disposed in logical communication with the communication bus and may be configured to direct communication among the confidence score determination module, the card type identification engine, the transaction counter-party industry identification engine, the ROC size assessor, and the transaction count aggregator. The transaction may be categorized according to a confidence scoring methodology.

In various embodiments, the card type data includes an indication of a category of a transaction card associated with the transaction. The card type data may include a category one card, a category two card, or a category three card. The category one card may be a consumer-oriented card. The category two card may be a small-business oriented card, and the category three card may be large business-oriented card.

The confidence score determination module may be further configured to determine a Prob-B determination including an aggregate total of all transactions associated with category two and category three cards divided by the aggregate total of all transactions associated with the category one and the category two and the category three cards combined.

The transaction counter-party industry identification engine may categorize a merchant in response to factors comprising at least one of industry, good provided, service provided, and merchant size.

The confidence score for the transaction may be a fraction between zero and one.

The confidence scoring methodology may include accepting, by a card type identification engine, card type data from a node of a distributed storage system, receiving from the node of the distributed storage system, by a transaction counter-party industry identification engine, data indicative of at least one of a merchant and a merchant type associated with a transaction, receiving from the node of the distributed storage system, by a ROC size assessor, a percentile calculation of a relative size of the transaction, and receiving from the node of the distributed storage system, by a transaction count aggregator, an annual transaction count data of a cardholder associated with the transaction within a merchant industry. A communication bus may be disposed in logical communication with a confidence score determination module, the card type identification engine, the transaction counter-party industry identification engine, the ROC size assessor, and the transaction count aggregator. A bus controller may be disposed in logical communication with the communication bus and may be configured to direct communication among the confidence score determination module, the card type identification engine, the transaction counter-party industry identification engine, the ROC size assessor, and the transaction count aggregator. The confidence scoring methodology may include determining, by the confidence score determination module, a confidence score for the transaction indicative of a probability that the transaction is a business transaction, whereby the transaction is categorized according to the confidence scoring methodology.

In various embodiments, the confidence scoring methodology further includes a customer identity, ROC size, and merchant identity, cross-referencing a plurality of Prob-B determination matrices in response to the customer identity, ROC size, and merchant industry, and selecting a Prob-B score from a Prob-B determination matrix in response to the cross-referencing.

In various embodiments, the card type data may include a category one card, a category two card, or a category three card. The confidence scoring methodology may also include determining, by the confidence score determination module, a Prob-B determination including an aggregate total of all transactions associated with category two cards and category three cards divided by the aggregate total of all transactions associated with the category one and category two and category three cards combined.

In various embodiments, the card type data includes a category one card, a category two card, or a category three card. The category one card includes a consumer-oriented card, the category two card includes a small-business oriented card, and the category three card includes a large business-oriented card. The confidence scoring methodology may further include categorizing a merchant, by the transaction counter-party industry identification engine, in response to factors including at least one of industry, good provided, service provided, and merchant size.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
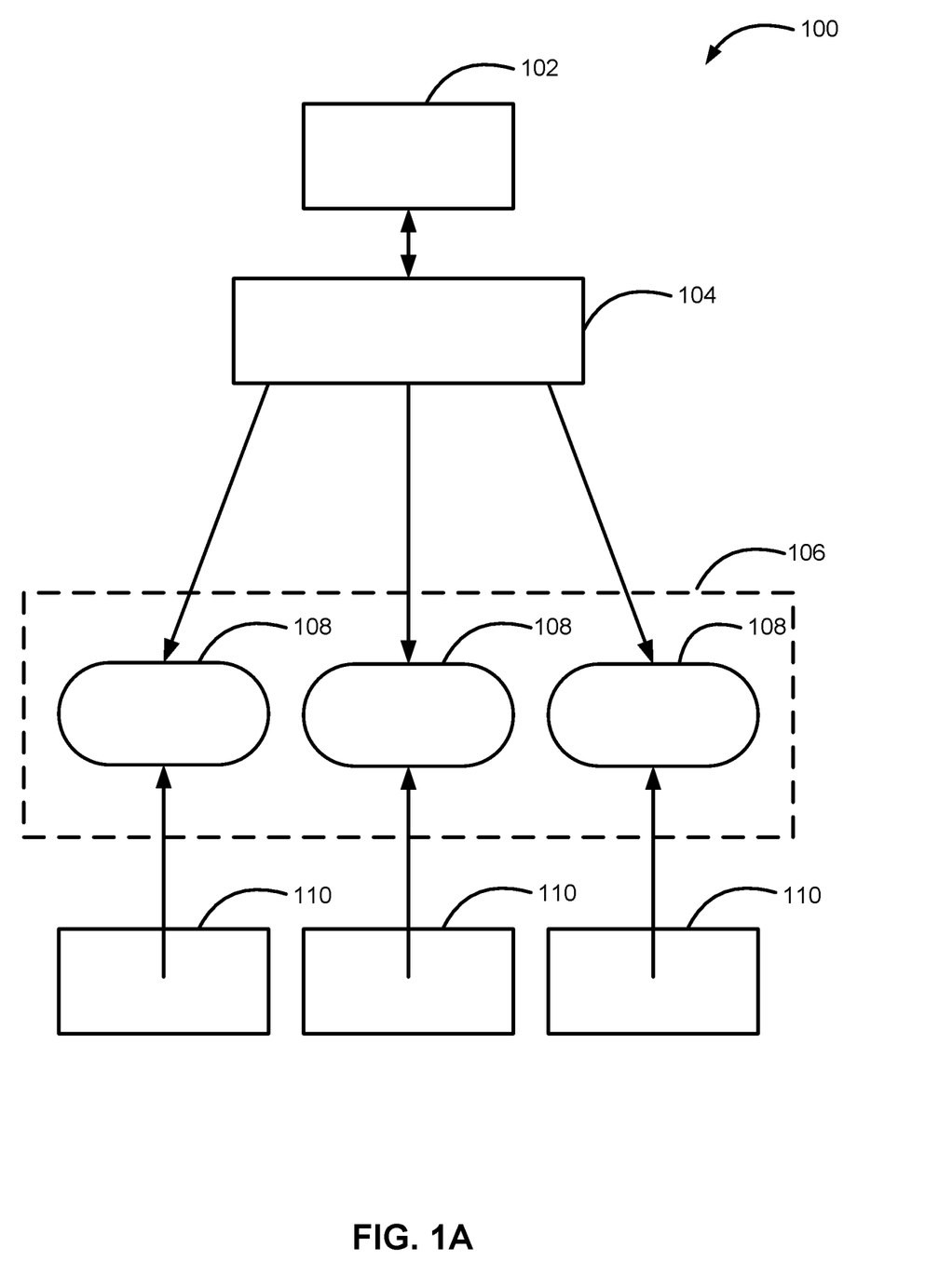
FIG. 1A illustrates an exemplary system for distributed storage and distributed processing, in accordance with various embodiments.

With reference to FIG. 1, system 100 for distributed data storage and processing is shown, in accordance with various embodiments. System 100 may comprise a transaction network host 102. Transaction network host 102 may comprise any device capable of receiving and/or processing an electronic message via telecommunications transfer channel 104. Telecommunications transfer channel 104 may comprise a network. Transaction network host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptography systems.

In various embodiments, transaction network host 102 may interact with distributed storage system 106 for storage and/or processing of big data sets. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to transaction network host 102. Nodes 108 may be distributed geographically in different locations, housed in the same building, and/or housed in the same rack. Nodes 108 may also be configured to function in concert to provide storage space and/or processing power greater than one of a node 108 might provide alone. As a result, distributed storage system 106 may collect and/or store the data 110. Data 110 may be collected by nodes 108 individually and compiled or in concert and collated. Data 110 may further be compiled into a data set and formatted for use in confidence scoring methodology 200 of FIG. 2.

In various embodiments, data 110 may comprise a collection of data including and/or originating from cardholder information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself, as well as the data stored in the structure.

The distributed storage system 106 may comprise a transaction network. A transaction network host 102 may comprise various modules and engines as discussed herein wherein the probability that a transaction is a business or personal transaction may be evaluated for establishing proper usage of differentiated transaction instruments according to their proper purposes. For instance, a probable personal transaction may be identified as being associated with a business-oriented transaction card, whereby the transaction network may tailor the handling of the transaction, such as by denying it, whereby the transaction network may actively deter misuse of transaction products whereby the transaction network more properly functions according to approved parameters.

Cardholders may frequently hold a business-oriented transaction card, but may complete consumer transactions via the card. Similarly, cardholders may frequently hold a consumer-oriented transaction card, but may complete business transactions via the card. These transactions may be confusing and frustrating for the identification and categorization of transaction data, while also hampering data analytics. Thus, in various embodiments, systems and methods are discussed herein enabling the identification of cardholders who are a business organization, and cardholders who are a consumer, as well as identifying which cards held by business organizations are being used for personal transactions and identifying which cards owned by consumers are being used for business transactions. These systems and methods permit the identification of consumers who hold consumer-oriented cards, and yet also are associated with a business organization. Thus, the card issuer may determine a probability that a transaction is a business transaction (a "Prob-B determination" or a "Probability-Business determination").

Moreover, such identifications enhance credit risk discrimination, identification of businesses and consumers associated with a business organization who may presently be consumer cardholders, whereby business-oriented transactions cards may be provided to them. Such identifications enable the promotion of relevant merchants to relevant cardholders such as to promote business-to-business relationship building and/or potential business-to-business relationships.

In various embodiments, a Prob-B determination involves multiple complex and interactive machine steps. For instance, by evaluating the data 110 at a transaction level, assessing the nature of a transaction as business or consumer at the individual transaction level provides sufficient granularity. Data may be evaluated at the transaction level and/or aggregated such as to determine if a cardholder (or supplementary card holder, or a third-party merchant with whom cardholders or supplementary card holders engage in transactions, or any other transaction party) may be identified as a business or a consumer. Moreover, such identification may be combined with or enhance the identification of such aspects as card product type, merchant industry codes, transaction amounts, number of transactions by an individual or a business in an industry, or at a particular merchant in an industry, determination of gross sales, removal of noise inducing transactions, and controlling for transactions having similar profiles, such as similar Prob-B determinations, such as to facilitate further data processing.

Thus, it may be appreciated that in view of the preceding discussion, Prob-B determinations may relate to three types of cardholders: individual card holders, small business cardholders, and large business cardholders. Each cardholder may be associated with one or more card type, for instance: a consumer-oriented card and a business-oriented card. One may further appreciate that Prob-B determinations may facilitate the identification of credit risk, likelihood of fraud (for instance, consumer-oriented transactions on a business oriented transaction card indicating fraudulent use or business-oriented transactions on a consumer oriented transaction card indicating liquidity/access-to-capital problems and elevated default risk for the business), identification and classification of business-to-business transactions and counterparties to the transactions to facilitate marketing, and tailoring of online ad experiences. Even furthermore, cardholders having transactions inconsistent with their card type can be cross-marketed other card types and credit limits established.

In various embodiments, removal of noise inducing transactions may be tailored according to the card type associated with the transaction ("noise filtering step"). For instance, among consumer oriented cards, cardholders that are not small business owners may be filtered, among business oriented cards, cardholders that fall within to one of three categories may be filtered, for instance for large business oriented cards, cardholders with revenue above a first revenue threshold, for instance, one million dollars annually or with spend above a first spend threshold, for instance, fifty thousand dollars annually, and for small business oriented cards those transactions identified as within a first sector, for instance, middle market. Transactions for which such identification is unknown may further be filtered. In this manner, the data ingested by the transaction network host 102 (FIG. 1B) may be said to be noise filtered for the removal of noise inducing transactions.

Figure 1B:
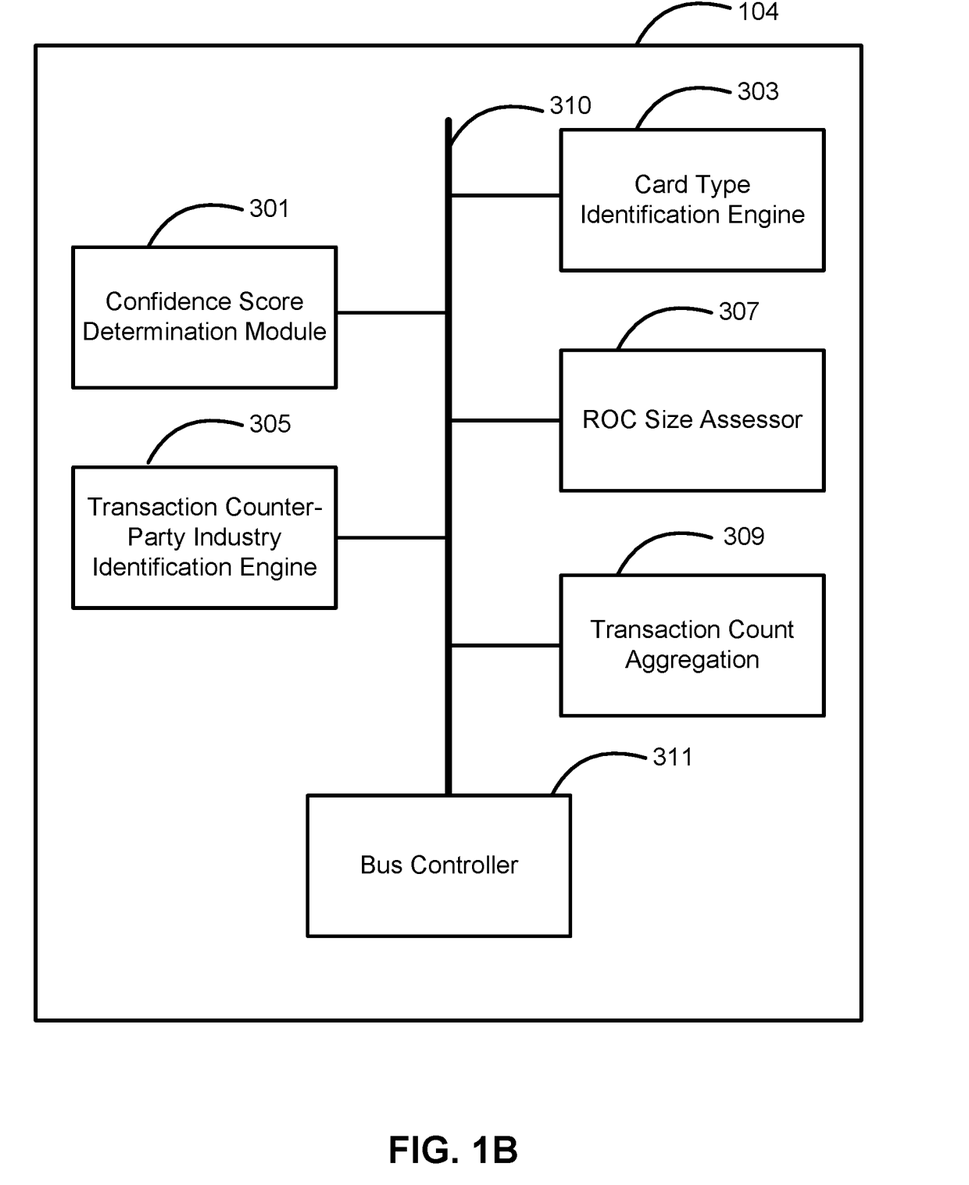
FIG. 1B illustrates an exemplary transaction network host component of a system according to FIG. 1A, in accordance with various embodiments.

In various embodiments, and with reference to FIG. 1B, a transaction network host 102 is described in more particular detail. For instance, a transaction network host 102 may comprise various logical modules configured to perform various operations and processes in accordance with methods disclosed herein. A transaction network host 102 may include a confidence score determination module 301. The confidence score determination module 301 may interoperate with a card type identification engine 303, as well as a transaction counter-party industry identification engine 305, a ROC size assessor 307, and a transaction count aggregator 309. Each such module may interoperate via a communication bus 310 by transceiving messages and data, and may perform various calculations, decisions, and operations in accordance with the teachings herein. Moreover, transaction network host 102 may further comprise a bus controller 311 configured to manage communications among modules on the communication bus 310, and direct various modules to perform various operations and processes in accordance with methods disclosed herein, as well as direct communications with external components such as distributed storage system 106, nodes 108, and/or the like.

Figure 2:
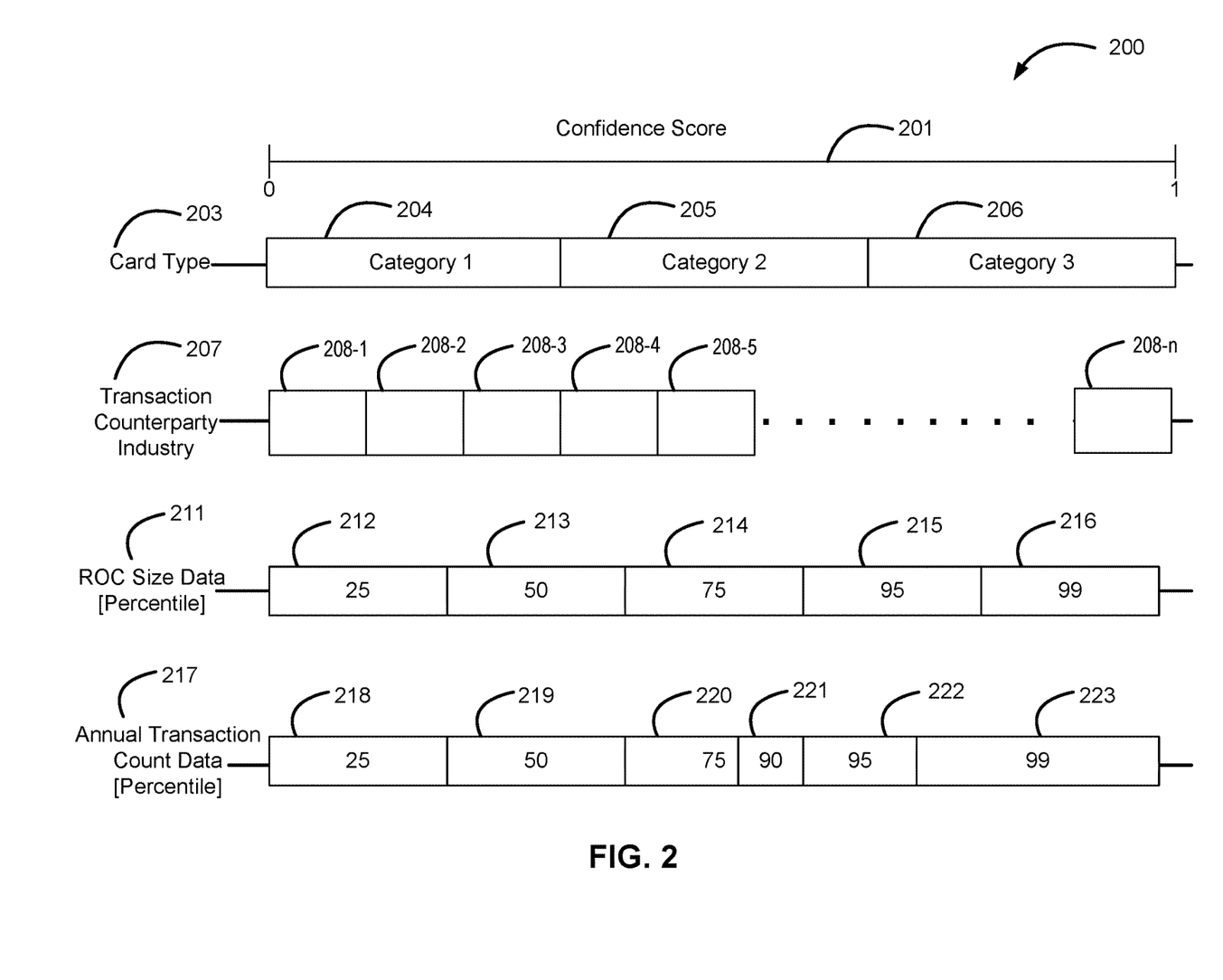
FIG. 2 illustrates an exemplary mechanism for confidence score determination by a transaction network host component of FIG. 1B, in accordance with various embodiments.

With reference to FIG. 1B and FIG. 2, a transaction network host 102 may determine a confidence score 201 according to a confidence scoring methodology 200. For instance, a bus controller 311 may direct a card type identification engine 303 of the transaction network host 102 to accept card type 203 data from nodes 108 of distributed storage system 106. The card type identification engine 303 may, for instance accept card type 203 data which may indicate the category of a transaction card associated with one or more transaction processed by the system 100. The card type identification engine 303 may thus determine a card type 203 from among various preprogrammed card type categories such as a category one 204, category two 205 or category three 206 card. In various embodiments, a category one card 204 may comprise a consumer-oriented card (e.g., a "consumer card"), a category two card 205 may comprise a small-business oriented card (e.g., an "SBO card"), and a category three card 206 may comprise a large business-oriented card (e.g., an "enterprise card).

Moreover, the bus controller 311 may direct a transaction counter-party industry identification engine 305 of the transaction network host 102 to accept from nodes 108 of distributed storage system 106, data indicative of a merchant type of a merchant associated with one or more transaction processed by the system 100. For instance, the transaction counter-party industry identification engine 305 of the transaction network host 102 may categorize a merchant by factors 208-1 through 208-$n$. These factors 208-1 through 208-$n$ may include categorization by industry, by good or service provided, by size, and/or the like.

Furthermore, the bus controller 311 may direct a ROC size assessor 307 of the transaction network host 102 to accept from nodes 108 of distributed storage system 106, ROC size data 211. ROC size data 211 may comprise a percentile calculation of the relative size of one or more transaction processed by the system 100 in comparison to the percentile range of all transactions processed by the system 100. For instance, a transaction may be determined to be with in the $25^{th}$ percentile of all transactions 212, the $50^{th}$ percentile of all transactions 213, the $75^{th}$ percentile of all transactions 214, the $95^{th}$ percentile of all transactions 215, or the $99^{th}$ percentile of all transactions 210.

Still furthermore, the bus controller 311 may direct a transaction count aggregator 309 of the transaction network host 102 to accept from nodes 108 of distributed storage system 106, data indicative of annual transaction count data 217 of the instant transaction card holder. In various embodiments, the annual transaction count data 217 may be confined to within a desired merchant industry. The annual transaction count data 217 may comprise a categorization of the number of transactions compared to the total number of transactions processed by the system 100, or relative to other cardholders, and/or in comparison to the percentile range of the number of total transactions processed by the system 100. For instance, the annual transaction count of the instant transaction card holder within a merchant industry may be determined to be in the $25^{th}$ percentile of all transactions 218, the $50^{th}$ percentile of all transactions 219, the $75^{th}$ percentile of all transactions 220, the $90^{th}$ percentile of all transactions 221, the $95^{th}$ percentile of all transactions 222, or the $99^{th}$ percentile of all transactions 223.

Finally, the bus controller 311 may direct a confidence score determination module 301. The confidence score determination module 301 may interoperate via communication bus 310 with the card type identification engine 303, the transaction counter-party industry identification engine 305, the ROC size assessor 307, and the transaction count aggregator 309 of the transaction network host 102 to determine a confidence score 201 for one or more transaction. The confidence score 201 may comprise a fraction between zero and 1, wherein zero indicates 0% probability that the transaction is a business transaction and one indicates 100% probability that the transaction is a business transaction. In this manner, the transaction network host 102 may assign a Prob-B determination to transactions.

Figure 3A:
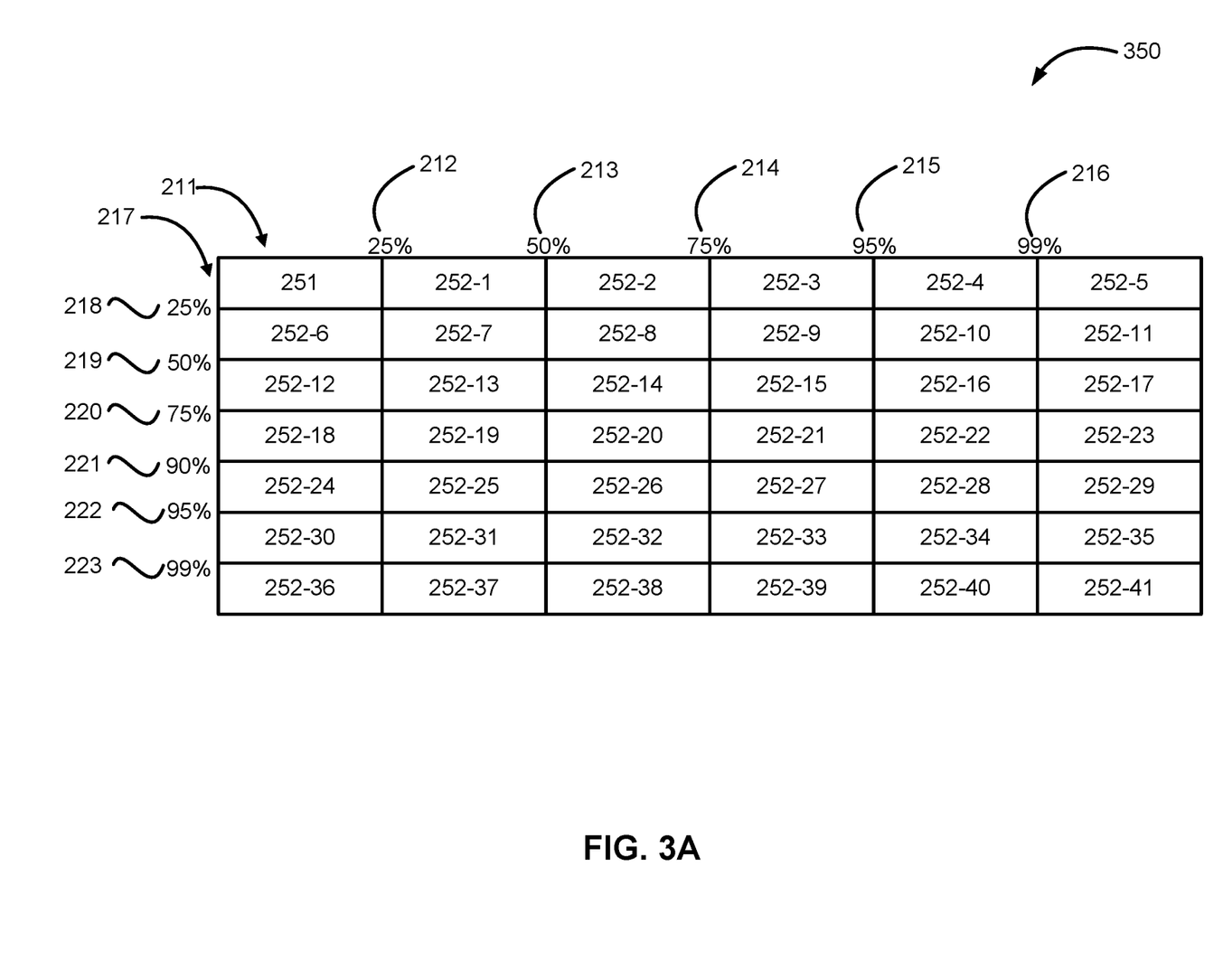
FIGS. 3A-C illustrate further aspects of confidence score determination according to FIG. 2, in accordance with various embodiments.
Figure 3B:
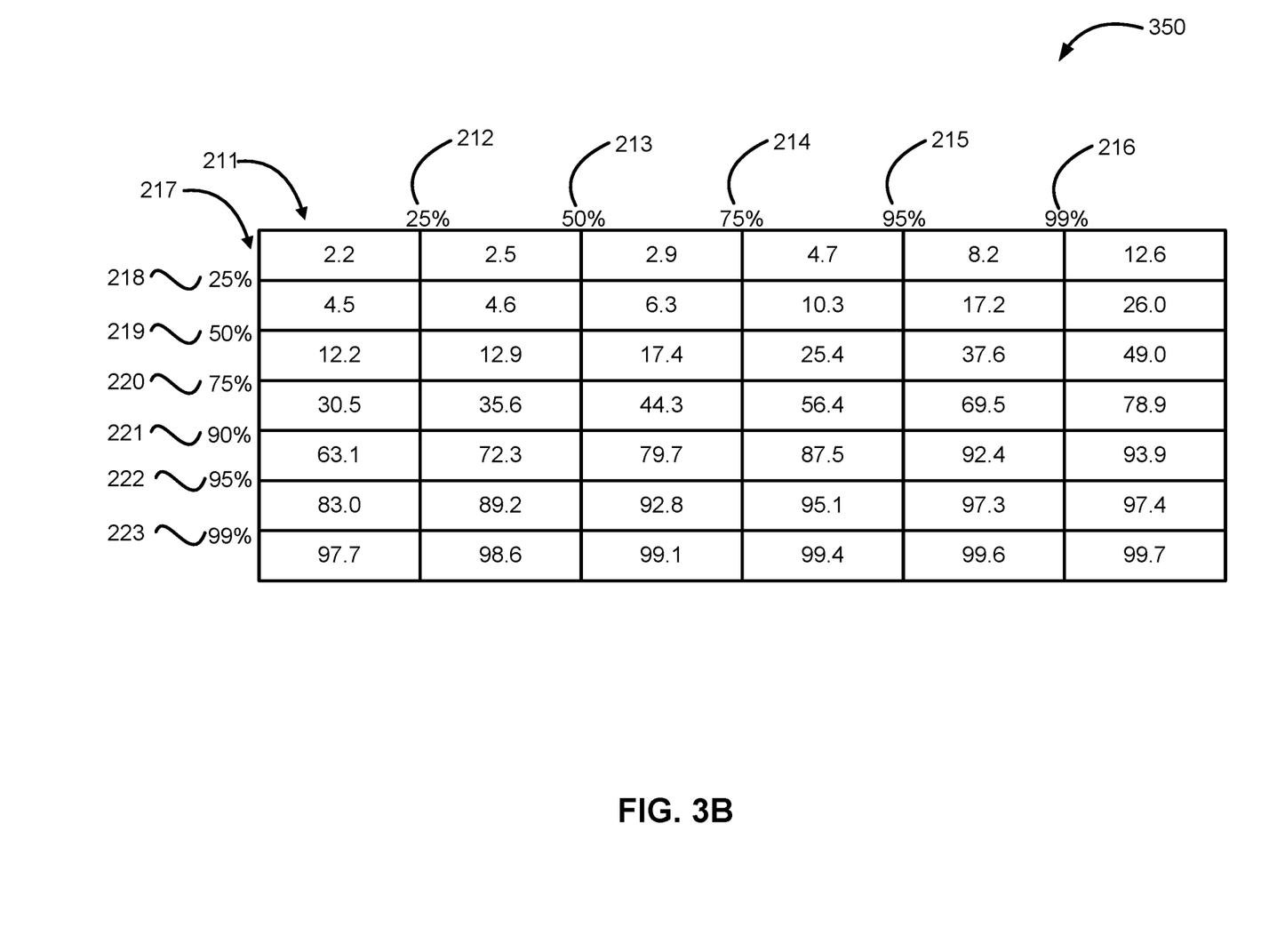
Figure 3C:
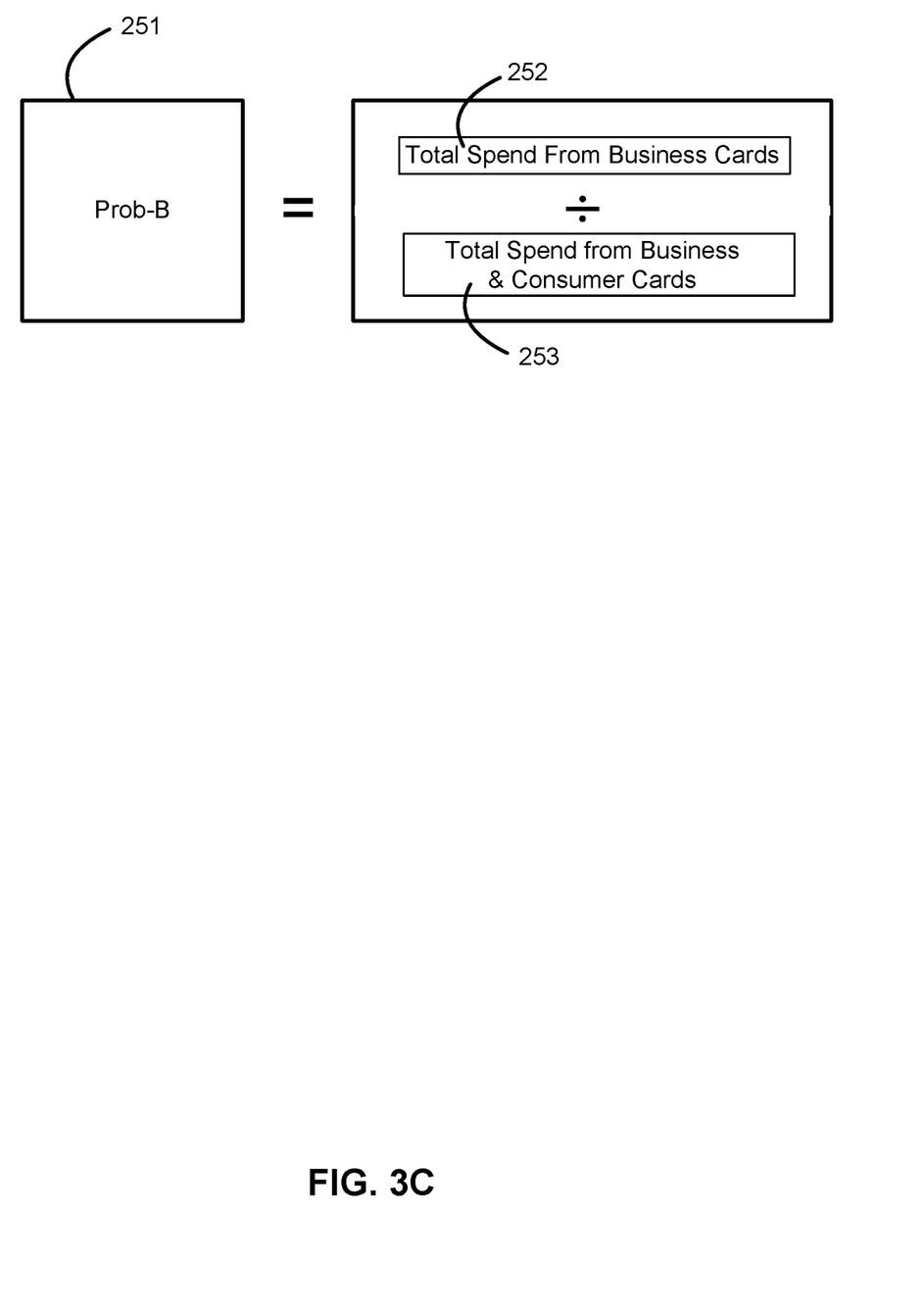

For example, a Prob-B determination may be assigned to transactions in the following way. With additional reference to FIG. 3C, the transaction network host 102 may calculate a total Prob-B 251 comprising the aggregate total of all transactions associated with category three 206 cards (Business-Oriented cards) divided by the aggregate total of all transactions associated with both category one 204 and category two 205 cards. With reference to FIG. 3A, a grid may be developed wherein the total Prob-B 251 determination comprises the upper left cell indicating the origin of the Prob-B determination matrix 350. In various embodiments, cells 353-1 through 252-41 designate different cells. As a transaction is evaluated according to confidence scoring methodology 200, the determined ROC size data 211 and the determined annual transaction count data 217 are cross referenced to the Prob-B determination matrix 350 to look up the instant Prob-B value stored in cells 252-1 through 252-41. For instance, with additional reference to FIG. 3B, such exemplary instant Prob-B values.

In various embodiments, such Prob-B determination matrices 350 may be developed for specific merchants and/or for entire merchant industries. In this manner, the confidence score 201 (the Prob-B determination) may be determined for each transaction in view of contextual aspects such as card type 203 and transaction counterparty industry 207, then communicated by transaction network host 102 via telecommunications transfer channel 104 to nodes 108.

Such Prob-B determination matrices 350 may be levereaged to score subsequent transactions and provide Prob-B determinations therefore. For instance, when a transaction occurs, data indicative of the identity of a customer, data indicative of the ROC size associated with the transaction, and data indicative of the merchants unique identifier may be ingested. For instance, various aspects of the transaction network host 102 as discussed herein may further ingest such data. By cross-referencing these three pieces of data to the Prob-B determination matrices 350, a Prob-B score may be looked up for the instant transaction and the instant transaction may be rapidly scored. In this manner, real-time or near real-time scoring of transactions may be achieved.

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocia®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CS S), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (1) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
receiving, by at least one computing device, account type data from at least one of a plurality of nodes in a distributed storage system, wherein the account type data comprises consumer-oriented accounts, small-business oriented accounts, and large business oriented accounts;
determining, by the at least one computing device, a merchant type for a merchant associated with a transaction in response to receiving merchant type data from at least one of the plurality of nodes in the distributed storage system;
receiving, by the at least one computing device, a percentile calculation of a relative size of the transaction in comparison to a percentile range of all transactions processed, the percentile calculation being received from at least one of the plurality of nodes in the distributed storage system;
receiving, by the at least one computing device, transaction count data within a merchant industry for an account holder associated with the transaction, the transaction count data being received from at least one of the plurality of nodes in the distributed storage system;
comparing, by the at least one computing device, the transaction count data with the percentile range of all transactions;
categorizing, by the at least one computing device, the transaction count data based at least in part on the comparing;
determining, by the at least one computing device, a confidence score for the transaction based at least in part on the account type data, the merchant type associated with the transaction, the percentile calculation of the relative size of the transaction, and the categorizing of the transaction count data of the account holder, wherein the confidence score is indicative of a probability that the transaction is a business transaction; and
categorizing, by the at least one computing device, the transaction as the business transaction based at least in part on the confidence score.

2. The method of claim 1,
wherein the consumer-oriented accounts comprise category one accounts, the small-business oriented accounts comprise category two accounts, and the large business oriented accounts comprise category three accounts, further comprising determining, by the at least one computing device, the probability that the transaction is the business transaction based at least in part on an aggregate total of all transactions associated with the category two accounts and the category three accounts divided by the aggregate total of all transactions associated with the category one accounts, the category two accounts and the category three accounts combined.

3. The method of claim 2, further comprising:
receiving, by the at least one computing device, a customer identity, record of charge (ROC) size data, and merchant identity, wherein the ROC size data comprises a relative size of the transaction compared to a range of sizes of all transactions.

4. The method of claim 1, wherein the merchant type is determined based at least in part on an industry, a type of good provided, a type of service provided, and a merchant size.

5. The method of claim 2, further comprising determining, by the at least one computing device, the probability that the transaction is the business transaction based at least in part on an aggregate total of all transactions associated with the category two accounts and the category three accounts divided by the aggregate total of all transactions associated with the category one accounts, the category two accounts and the category three accounts combined.

6. The method of claim 3, further comprising:
cross-referencing, by the at least one computing device a plurality of determination matrices showing a probability that the transaction is a business transaction, in response to the customer identity, the ROC size data, and the merchant industry; and
selecting, by the at least one computing device, a probability of business score from one of the plurality of determination matrices, in response to the cross-referencing, the confidence score being based at least in part on the probability of business score.

7. The method of claim 6, wherein individual determination matrices of the plurality of determination matrices are generated for a specific merchant industry.

8. The method of claim 1, further comprising receiving the merchant type data from the at least one of the plurality of nodes in the distributed storage system.

9. A system, comprising:
at least one computing device;
at least one application executable by the at least one computing device, wherein, when executed, the at least one application causes the at least one computing device to at least:
receive account type data from at least one of a plurality of nodes in a distributed storage system, wherein the account type data comprises consumer-oriented accounts, small-business oriented accounts, and large business oriented accounts;
determine a merchant type for a merchant associated with a transaction in response to receiving merchant type data from at least one of the plurality of nodes in the distributed storage system;
receive a percentile calculation of a relative size of the transaction in comparison to a percentile range of all transactions processed, the percentile calculation being received from at least one of the plurality of nodes;
receive transaction count data within a merchant industry for an account holder associated with the transaction;
compare the transaction count data with the percentile range of all transactions;
categorize the transaction count data in response to comparing the transaction count data with the percentile range of all transactions;
determine a confidence score for the transaction based at least in part on the account type data, the merchant type associated with the transaction, the percentile calculation of the relative size of the transaction, and categorizing of the transaction count data of the account holder, wherein the confidence score is indicative of a probability that the transaction is a business transaction; and
associate the transaction as a business transaction based at least in part on the confidence score.

10. The system of claim 9, wherein, when executed, the at least one application causes the at least one computing device to at least categorize the merchant according to a plurality of factors, and determining the merchant type is based at least in part on a merchant type categorization.

11. The system of claim 10, wherein the plurality of factors comprise at least one of an industry, a merchant size, a type of good provided, or a type of services provided.

12. The system of claim 9, wherein, when executed, the at least one application further causes the at least one computing device to at least receive transaction data comprising a customer identity, a record of charge (ROC) size data, and a merchant identity from at least one of the plurality of nodes.

13. The system of claim 12, wherein, when executed, the at least one application further causes the at least one computing device to at least identify a probability of business score according to a plurality of determination matrices and the transaction data, the confidence score being based at least in part on the probability of business score.

14. A non-transitory computer-readable medium comprising a program executable on at least one computing device, wherein, when executed, the program causes the at least one computing device to at least:
receive account type data from at least one of a plurality of nodes in a distributed storage system;
receive merchant type data from at least one of the plurality of nodes in the distributed storage system;
determine a merchant type for a merchant associated with a transaction in response to receiving the merchant type data from the at least one of the plurality of nodes in the distributed storage system;
receive a percentile calculation of a relative size of the transaction in comparison to a percentile range of all transactions processed, the percentile calculation being received from at least one of the plurality of nodes;
receive transaction count data within a merchant industry for an account holder associated with the transaction, the transaction count data being received from at least one of the plurality of nodes;
compare the transaction count data with the percentile range of all transactions;
categorize the transaction count data in response to comparing the transaction count data with the percentile range of all transactions;
determine a confidence score for the transaction based at least in part on the account type data, the merchant type associated with the transaction, the percentile calculation of the relative size of the transaction, and categorizing of the transaction count data of the account holder, wherein the confidence score is indicative of a probability that the transaction is a business transaction; and
associate the transaction as a business transaction based at least in part on the confidence score.

15. The non-transitory computer-readable medium of claim 14, wherein determining the merchant type comprises categorizing the merchant type data based at least in part on a plurality of factors.

16. The non-transitory computer-readable medium of claim 15, wherein the plurality of factors comprise at least one of: an industry, a good provided, a service provided, or an entity size.

17. The non-transitory computer-readable medium of claim 14, wherein the account type data comprises a plurality of different account categories, and when executed, the program further causes the at least one computing device to at least determine the probability that the transaction is the business transaction based at least in part on an aggregate total of all transactions associated with a first account category and a second account category divided by the aggregate total of all transactions associated with a third account category.

18. The non-transitory computer-readable medium of claim 17, wherein, when executed, the program further causes the at least one computing device to at least select a probability of business score from a plurality of determination matrices based at least in part on a customer identity, a record of charge (ROC) size data, a merchant identity, the plurality of determination matrices being configured to indicate a probability that the transaction is a business transaction.

19. The non-transitory computer-readable medium of claim 14, wherein the account type data comprises consumer-oriented accounts, small-business oriented accounts, and large business oriented accounts.

* * * * *